(12) United States Patent
Hveding et al.

(10) Patent No.: US 11,698,288 B2
(45) Date of Patent: Jul. 11, 2023

(54) SIGNAL TO NOISE RATIO MANAGEMENT

(71) Applicants: Saudi Arabian Oil Company, Dhahran (SA); King Abdullah University of Science and Technology, Thuwal (SA)

(72) Inventors: Frode Hveding, Dhahran (SA); Islam Ashry, Thuwal (SA); Mao Yuan, Thuwal (SA); Mohd Sharizal Bin Alias, Thuwal (SA); Boon Siew Ooi, Thuwal (SA); Muhammad Arsalan, Dhahran (SA)

(73) Assignees: Saudi Arabian Oil Company, Dhahran (SA); King Abdullah University of Science and Technology, Dhahran (SA)

( * ) Notice: Subject to any disclaimer, the term of this patent is extended or adjusted under 35 U.S.C. 154(b) by 1275 days.

(21) Appl. No.: 16/190,302

(22) Filed: Nov. 14, 2018

(65) Prior Publication Data
US 2020/0149952 A1    May 14, 2020

(51) Int. Cl.
*G01H 9/00* (2006.01)
*G01D 5/353* (2006.01)
*G01V 1/22* (2006.01)

(52) U.S. Cl.
CPC ......... *G01H 9/004* (2013.01); *G01D 5/35354* (2013.01); *G01D 5/35361* (2013.01); *G01V 1/226* (2013.01)

(58) Field of Classification Search
None
See application file for complete search history.

(56) References Cited

U.S. PATENT DOCUMENTS

| | | | |
|---|---|---|---|
| 6,913,079 B2 | 7/2005 | Tubel | |
| 7,946,341 B2 | 5/2011 | Hartog et al. | |
| 8,408,064 B2 | 4/2013 | Hartog et al. | |
| 9,140,815 B2 | 9/2015 | Lopez et al. | |
| 9,170,149 B2 | 10/2015 | Hartog et al. | |
| 9,321,222 B2 | 4/2016 | Childers et al. | |

(Continued)

FOREIGN PATENT DOCUMENTS

| | | | |
|---|---|---|---|
| CA | 2854124 A1 * | 5/2013 | ......... G01D 5/35303 |
| CN | 101488805 | 8/2012 | |

(Continued)

OTHER PUBLICATIONS

Feng et al., Machine Translation of CN 105067104 A, Nov. 2015. (Year: 2015).*

(Continued)

*Primary Examiner* — Michelle R Connelly
(74) *Attorney, Agent, or Firm* — Fish & Richardson P.C.

(57) ABSTRACT

The subject matter of this specification can be embodied in, among other things, a method for remotely sensing vibration includes transmitting a collection of optical pulses through an optical fiber at a predetermined frequency, detecting a collection of backscattered Rayleigh traces from the optical fiber based on a vibration of the optical fiber at a vibration frequency at a location along the optical fiber, determining a normalized differential trace based on the collection of Rayleigh traces, determining, based on the normalized differential trace, the location in the optical fiber of the vibration, and determining, based on the raw Rayleigh traces, the vibration frequency.

15 Claims, 8 Drawing Sheets

(56) References Cited

U.S. PATENT DOCUMENTS

| | | | |
|---|---|---|---|
| 2008/0100828 A1 | 5/2008 | Cyr et al. | |
| 2013/0091942 A1 | 4/2013 | Samson et al. | |
| 2013/0167628 A1 | 7/2013 | Hull et al. | |
| 2013/0265851 A1* | 10/2013 | Faber | G01V 1/42 367/25 |
| 2015/0318920 A1 | 11/2015 | Johnston | |
| 2016/0275788 A1* | 9/2016 | Wu | G08G 1/02 |
| 2017/0075029 A1 | 3/2017 | Cuny et al. | |
| 2017/0211970 A1* | 7/2017 | Milione | G01H 9/004 |
| 2017/0235006 A1 | 8/2017 | Ellmauthaler et al. | |
| 2019/0128731 A1* | 5/2019 | Cedilnik | G01D 5/35361 |

FOREIGN PATENT DOCUMENTS

| | | | |
|---|---|---|---|
| CN | 105067104 A | * | 11/2015 |
| CN | 107144339 | | 9/2017 |
| CN | 206496768 | | 9/2017 |
| CN | 105371943 | | 6/2018 |
| WO | WO-2017156334 A1 | * | 9/2017 ....... E21B 47/02208 |

OTHER PUBLICATIONS

Zhang et al. ("Modulated Pulses Based High Spatial Resolution Distributed Fiber System for Multi-Parameter Sensing," Optics Express, Aug. 2016). (Year: 2016).*

Qin et al., "Signal-to-Noise Ratio Enhancement Based on Empirical Mode Decomposition in Phase-Sensitive Optical Time Domain Reflectometry Systems," Sensors, MDPI, vol. 17, Aug. 14, 2017, 10 pages.

GCC Examination Report issued in GCC Application No. GC 2019-38630 dated Oct. 11, 2020, 3 pages.

PCT International Search Report and Written Opinion in International Appln. No. PCT/US2019/061130, dated Mar. 2, 2020, 15 pages.

GCC Examination Report in GCC Appln. No. GC 2019-38630, dated Mar. 17, 2021, 3 pages.

* cited by examiner

SIGNAL TO NOISE RATIO MANAGEMENT

TECHNICAL FIELD

This instant specification relates to optical fiber vibration sensors with improved signal to noise ratio management.

BACKGROUND

Among existing approaches for distributed sensing, the fiber optic paradigm is particularly unique, given its numerous advantages including immunity to electromagnetic interference, miniature sizes, harsh environment operation, and capability of large-scale multiplexing. One example is the optical fiber distributed acoustic sensor (DAS) designed using phase-sensitive optical time domain reflectometry (Φ-OTDR). The ΦOTDR based DAS has been deployed in applications such as real time structural health monitoring, oil and gas industry, and aerospace transportation. Its operation principle consists of launching a train of optical pulses, generated by a narrow linewidth laser, into the fiber under test (FUT). At the FUT input port, consecutive Rayleigh backscattered traces are recorded in the time domain. Each Rayleigh trace has a speckle-like profile because of coherent interference of the signals reflected by scattering centers within the injected pulse duration. In the absence of intrusion along the FUT, (such as no refractive index perturbation) the recorded Rayleigh traces are ideally identical. When an acoustic signal is applied at a position along the FUT, the effective refractive index changes at this position, and consequently the intrusion can be sensed by observing the intensity fluctuation of a corresponding speckle in the recorded traces.

In the typical direct and coherent detection schemes used for the Φ-OTDR based DAS, there are several noise sources such as temporal pulse intensity fluctuation, laser phase noise and frequency drift, low extinction ratio of the launched pulses, and photodetector thermal and shot noises. These noises can degrade the stability of the recorded Rayleigh traces in the time-domain, which consequently decreases the signal-to-noise ratio (SNR) of the system.

Averaging traces is signal-processing technique commonly used to mitigate the intensity fluctuation of the Rayleigh traces. Unfortunately, this technique limits the maximum detectable vibration frequency. Assuming that each averaged trace is calculated using N consecutive traces, the effective sampling rate reduces to equal the repetition rate of injecting pulses divided by N. As a result, based on the sampling theory, the maximum detectable frequency (the Nyquist frequency) is reduced by a factor of N, in comparison to a no-averaging case. Some other existing implementations use a moving average and moving differential technique to achieve approximately twice frequency response of the traditional averaging method, which is less than the Nyquist frequency.

SUMMARY

In general, this document describes systems and techniques for improving signal to noise ratios in optical fiber vibration sensors.

In a first aspect, a method for remotely sensing vibration includes transmitting a collection of optical pulses through an optical fiber at a predetermined frequency, detecting a collection of backscattered Rayleigh traces from the optical fiber based on a vibration of the optical fiber at a vibration frequency at a location along the optical fiber, determining a normalized differential trace based on the collection of Rayleigh traces, determining, based on the normalized differential trace, the location in the optical fiber of the vibration, and determining, based on the raw Rayleigh traces, the vibration frequency.

Various implementations can include some, all, or none of the following features. The collection of optical pulses can be transmitted at a predetermined frequency, and the vibration frequency can be determined up to substantially (within 10%) the Nyquist frequency of the predetermined frequency. Determining the normalized differential trace based on the collection of Rayleigh traces can also include determining the normalized differential trace ($\Delta R_N$) based on a predetermined number (N) of Rayleigh traces (R) as $\Delta R_N=(R_{i+1}-R_i)/R_i$, $i\in[1, N-1]$. Transmitting a collection of optical pulses through an optical fiber at a predetermined frequency can include generating, by a light source, continuous-wave light, converting, by a first optical modulator, the continuous-wave light into the collection of optical pulses having the predetermined frequency, amplifying, by an optical amplifier, the collection of optical pulses, directing the optical pulses to a first port of an optical circulator, and directing, by the optical circulator, the optical pulses to a second port of the optical circulator in optical communication with the optical fiber. The method can also include tuning, by a first polarization controller, the continuous-wave light, tuning, by a second polarization controller, the collection of optical pulses, and enhancing, by a second optical modulator configured to operate substantially in synchronicity with the first optical modulator, an extinction ratio of the optical pulses. The method can also include receiving, at the second port of the optical circulator, the backscattered Rayleigh traces, directing the backscattered Rayleigh traces to a third port of the optical circulator, amplifying, by a second optical amplifier, the backscattered Rayleigh traces, filtering, by a Bragg grating, the amplified backscattered Rayleigh traces, and converting, by a photodetector in optical communication with the third port, the filtered backscattered Rayleigh traces into a collection of analog electrical signals. The optical fiber can be a single-mode fiber under test.

In a second aspect, a vibration sensor system includes a light pulse generator configured to provide a collection of optical pulses, an optical fiber having a predetermined length and configured to guide the optical pulses, a sensor configured to determine a location and frequency of a vibration of the optical fiber at a location along the optical fiber, based on a normalized differential trace that is determined based on a collection of backscattered Rayleigh traces.

Various embodiments can include some, all, or none of the following features. The collection of optical pulses can be transmitted at a predetermined frequency, and the frequency of the vibration can be determined up to substantially the Nyquist frequency of the predetermined frequency. The normalized differential trace ($\Delta R_N$) can be based on a predetermined number (N) of Rayleigh traces (R) as $\Delta R_n=(R_{i+1}-R_i)/R_i$, $i\in[1, N-1]$. The light pulse generator can include a light source configured to generate continuous-wave light, a first optical modulator configured to convert the continuous-wave light into the collection of optical pulses having a predetermined frequency, an optical amplifier configured to amplify the collection of optical pulses, and an optical circulator having a first port configured to receive the optical pulses and provide the optical pulses to a second port that is optically coupled to the optical fiber, where the second port is also configured to receive the backscattering of the Rayleigh traces and provide the backscattered Rayleigh traces to a third port that is in optical communication with the sensor. The system can also include a first polarization controller configured to tune the continuous-wave light, a second polarization controller configured to tune the collection of optical pulses, and a second optical modulator configured to operate substantially in synchronicity with the first optical modulator to enhance an extinction ratio of the optical pulses. The sensor can include an optical amplifier configured to amplify the backscattering of the Rayleigh traces, a Bragg grating configured to filter the amplified backscattering of the Rayleigh traces, and a photodetector in optical communication with the third port, configured to convert the filtered backscattered Rayleigh traces into a collection of analog electrical signals. The optical fiber can be a single-mode fiber under test. The system can include a non-transitory computer storage medium encoded with a computer program, the program including instructions that when executed by data processing apparatus cause the data processing apparatus to perform operations including transmitting a collection of optical pulses through the optical fiber at a predetermined frequency, detecting the backscattering of the Rayleigh traces from the optical fiber based on a vibration of the optical fiber at a vibration frequency at a location along the optical fiber, determining a normalized differential trace based on the collection of Rayleigh traces, determining, based on the normalized differential trace, the location in the optical fiber of the vibration, and determining, based on the raw Rayleigh traces, the vibration frequency.

In a third embodiment, a non-transitory computer storage medium encoded with a computer program, where the program includes instructions that when executed by data processing apparatus cause the data processing apparatus to perform operations including digitizing a collection of backscattered Rayleigh traces from an optical fiber based on a vibration of the optical fiber at a vibration frequency at a location along the optical fiber, determining a normalized differential trace based on the collection of Rayleigh traces, determining, based on the normalized differential trace, the location along the optical fiber, and determining, based on the raw Rayleigh traces, the vibration frequency. The backscattered Rayleigh traces of the collection of optical pulses are transmitted at a predetermined frequency, and the vibration frequency can be determined up to substantially the Nyquist frequency of the predetermined frequency (such as up to within 10% of the Nyquist frequency). Determining the normalized differential trace based on the collection of Rayleigh traces can include determining the normalized differential trace ($\Delta R_N$) can be based on a predetermined number (N) of Rayleigh traces (R) as $\Delta R_N = (R_{i+1} - R_i)/R_i$, $i \in [1, N-1]$. The operations can also include transmitting a collection of optical pulses through the optical fiber at a predetermined frequency.

The systems and techniques described here may provide one or more of the following advantages. First, a system can provide signal-to-noise ratio management, without data averaging, which enables detecting vibrations with frequencies up to the Nyquist frequency. Second, the system can improve noise equalization along the fiber, and improve the ability to identify fiber locations subjected to weak vibrations. Third, the system can process data with greater speed and efficiency because averaging is not required.

The details of one or more implementations are set forth in the accompanying drawings and the description below. Other features and advantages will be apparent from the description and drawings, and from the claims.

DETAILED DESCRIPTION

This document describes systems and techniques for improving signal to noise ratios (SNR) in optical fiber vibration sensors, with an ability to detect frequencies up to approximately the system's Nyquist frequency. In general, the Nyquist theorem states that the minimum sampling rate required to sample and identify a particular frequency is twice that of the particular frequency. For example, in order to sense and identify a 10 (kilohertz) kHz signal, the signal would need to be sampled at a rate of 20 kHz or higher. Previous techniques use averaging or a moving average, which reduces the effective sampling rate by a factor of the number of samples being averaged (for example, a 10 sample moving average results in ⅒ the sampling frequency). As more samples are averaged in order to improve SNR in previous systems, the lower the effective sampling rate and the lower the maximum detectable frequency becomes. In contrast, the systems and techniques described in the upcoming paragraphs provide SNR management and frequency detection up to approximately the Nyquist limit of the system.

Figure 1:
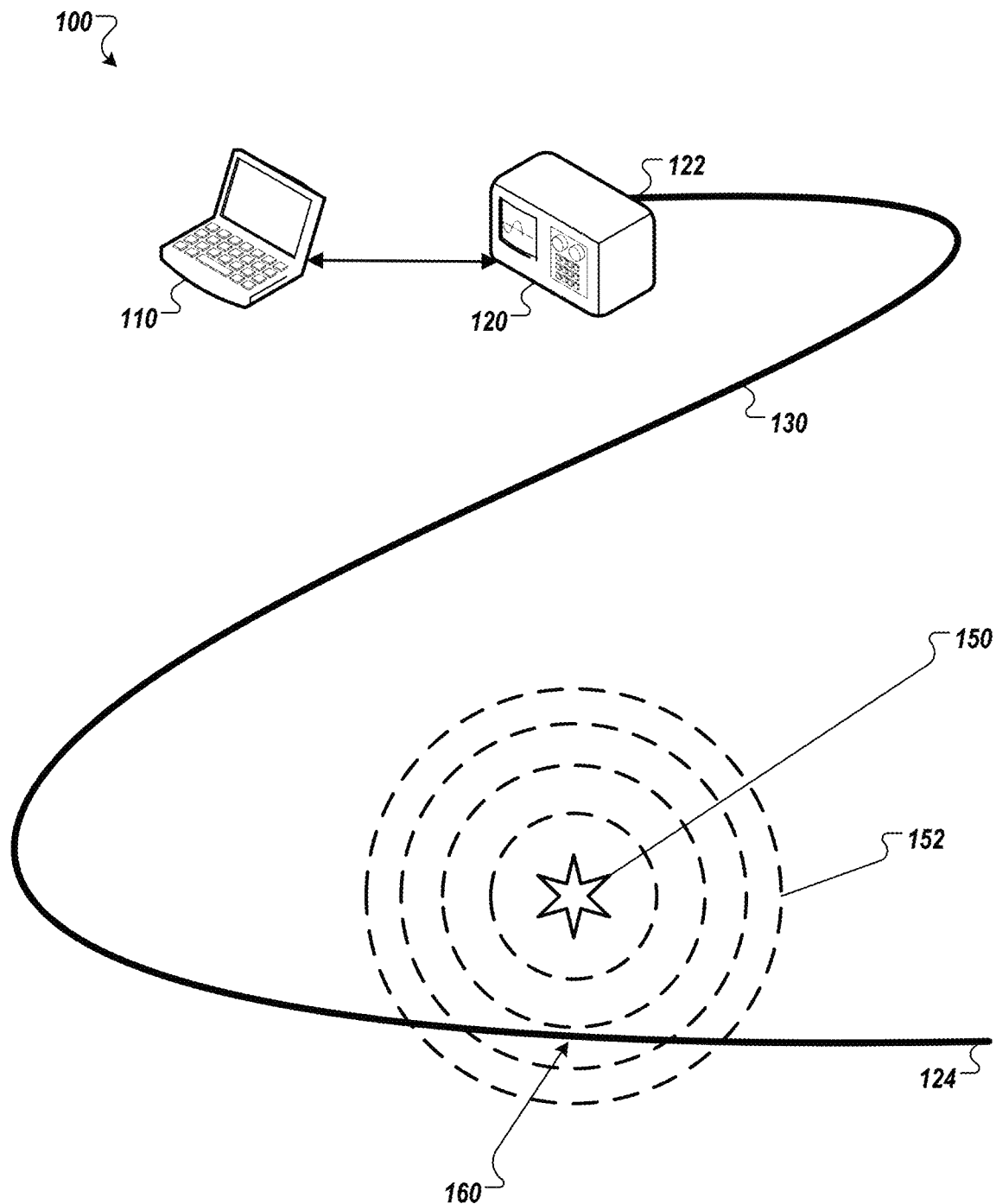
FIG. 1 is a schematic diagram that shows an example of a system for remotely sensing vibration.

FIG. 1 is a schematic diagram that shows an example of a system 100 for remotely sensing vibration. The system 100 is a phase-sensitive optical time domain reflectometry (Φ-OTDR) based optical fiber distributed acoustic sensor (DAS) system that includes a computing system 110, a sensor system 120, and a fiber under test (FUT) 130. The computing system 110 is in electronic communication with the sensor system 120 (such as through a network connection or a universal serial bus connection).

The FUT 130 is an optical fiber that is optically coupled to the sensor system 120 at a proximal end 122 and extends a distance (multiple kilometers, for example) to a distal end 124. In the illustrated example, a vibration source 150 emits vibrations 152 at a particular frequency. The vibrations 152 intersect the FUT 130 and vibrate the FUT 130 at, near, or around a location 160.

The system 100 uses a technique that improves the SNR of a phase-sensitive optical time domain reflectometry (Φ-OTDR) based optical fiber distributed acoustic sensor (DAS) system. In general, and as will be discussed in more detail later, a normalized differential is applied between consecutive Rayleigh traces without averaging.

Figure 2:
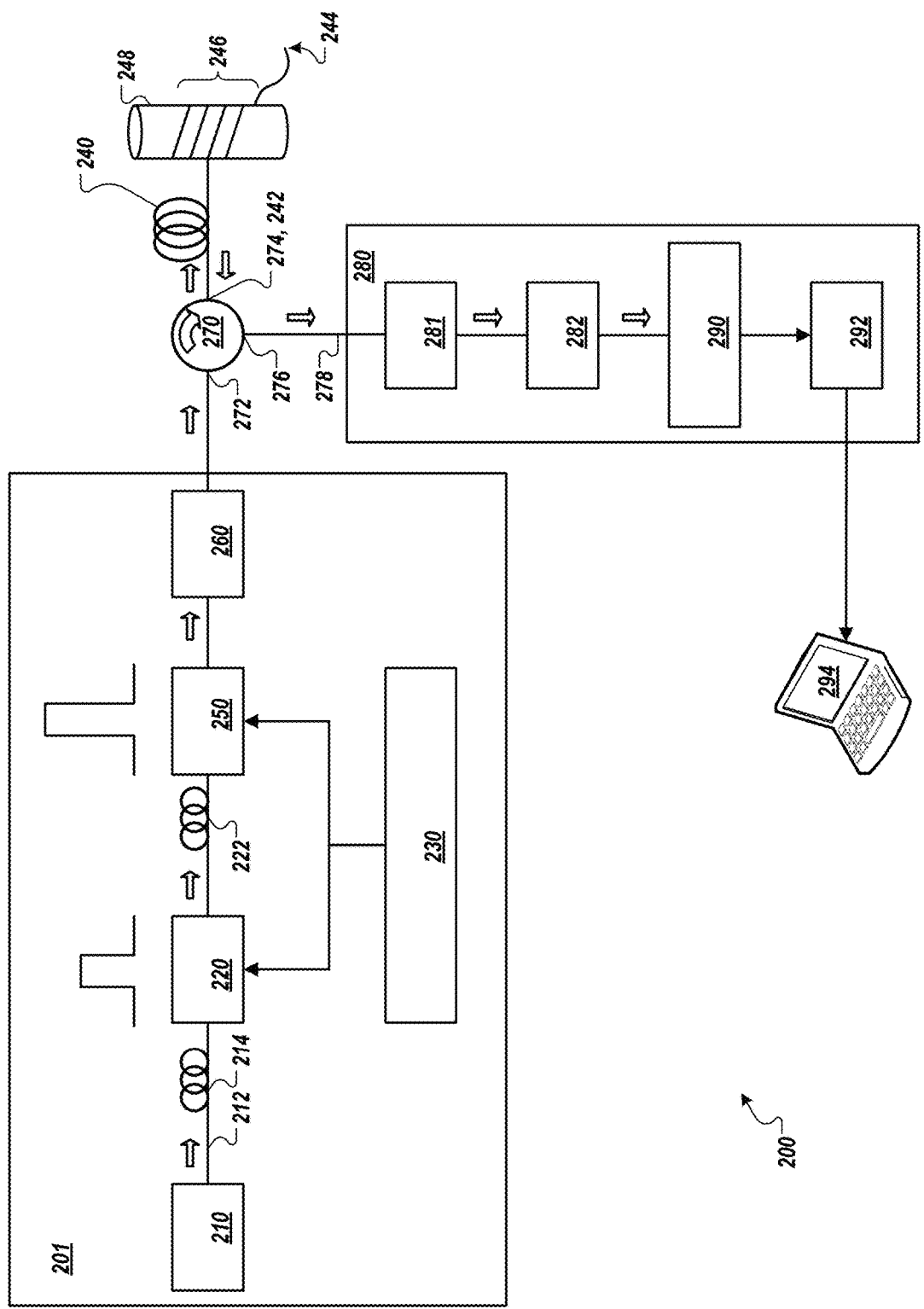
FIG. 2 is a block diagram that shows an example of a system for remotely sensing vibration.

FIG. 2 is a block diagram that shows an example of a system 200 for remotely sensing vibration. In some implementations, the system 200 can be the example system 100 of FIG. 1.

The system 200 includes a light pulse generator 201. A light source 210 of the light pulse generator 201 emits light into a fiber 212. In the illustrated example, the light source 210 is a narrow-linewidth (100 kHz, for example) laser source that generates continuous-wave (CW) light of about 10 milliwatt (mW) optical power at an operational wavelength of about 1530 nanometers (nm). The laser light is modulated by an electro-optic modulator 220 (EOM 1) to produce optical pulses. The modulation of the electro-optic modulator 220 is controlled by control pulses provided by a pulse generator 230. In the illustrated example, the pulses have a 20 kHz repetition rate and 100 nanoseconds (ns) width, which offers a 10 meter (m) sensing spatial resolution along a fiber under test 240 (FUT), and a Nyquist limit of 10 kHz (which corresponds to one-half of the pulse rate in this example). The electro-optic modulator 220 is sensitive to the input light polarization state, so a polarization controller 214 (PC 1) is configured to maximize the peak output power of the pulses generated by the electro-optic modulator 220. The specific values used in this document for the pulse rate, power, wavelength, pulse width, and any other configurable values are merely examples of configurations that can be used. In some implementations, any appropriate combination of values can be used.

An electro-optic modulator 250 (EOM 2) is configured to enhance the extinction ratio (ER) of the optical pulses. The electro-optic modulator 250 is also driven by the control pulses provided by the pulse generator 230. The electro-optic modulator 220 and the electro-optic modulator 250 are driven by the same control pulses, which causes the electro-optic modulator 220 and the electro-optic modulator 250 to operate in synchronicity with each other. A polarization controller 222 (PC 2) is configured to tune the peak power of the pulses produced by the electro-optic modulator 250. In some embodiments, one or more of the electro-optic modulator 220, the electro-optic modulator 250, the polarization controller 214, and the polarization controller 222 can be replaced with any other appropriate continuous-wave-to-pulse converter such as an acousto-optic modulator (AOM).

The modulated light is amplified by an erbium-doped-fiber-amplifier 260 (EDFA1). The amplified modulated light is provided to an optical port 272 of an optical circulator 270. The optical circulator 270 provides the amplified modulated light to an optical port 274 that is optically coupled to a proximal end 242 of the fiber under test 240. In some embodiments in which the laser power is sufficiently high, the erbium-doped-fiber-amplifier 260 may be omitted.

The fiber under test 240 is a single mode fiber of 4 kilometers (km) length at a distal end 244 opposite the proximal end 242, but this is just one example. In various implementations, any appropriate length of fiber can be used. The illustrated example depicts an experimental (laboratory) configuration of the system 200, in which a piezo transducer (PZT) cylinder 248 is used as a source of vibration to be detected by the system 200. In the illustrated example, a section 246 (for example, 10 m) of the fiber under test 240 near the distal end 244 is attached to a piezo transducer (PZT) cylinder 248 that is configured to vibrate at a frequency that is controllable via a function generator (not shown).

In some embodiments, the piezo transducer cylinder 248 can be replaced with any other appropriate vibration source.

As described in the previous paragraph, the illustrated example depicts an experimental (laboratory) configuration of the system 200, in which the piezo transducer cylinder 248 is used as a source of vibration to be detected by the system 200. In the illustrated example, the vibration frequency of the piezo transducer cylinder is predetermined by a function generator, which facilitates calibration the system. In other implementations, the fiber under test 240 would be strung along a region to be monitored, and the vibration would come from other sources along a region to be monitored near the fiber under test 240. For example, the fiber under test 240 could be extended in buildings, oil/gas wells, or industrial sites to sense vibrations which might be produced by structural cracks, oil/gas flows, or human/machines activities.

As a launched pulse propagates within the fiber under test 240, part of its power is backscattered by the optical phenomenon commonly referred to as Rayleigh scattering. The backscattered light travels through the fiber under test 240, back to the optical port 274. The optical circulator 270 directs the backscattered light to an optical port 276 that is in optical communication with an optical fiber 278.

The optical fiber 278 directs the backscattered Rayleigh traces to a receiver 280. The receiver 280 includes an erbium-doped fiber amplifier 281 (EDFA 2). The traces are amplified by the erbium-doped fiber amplifier 281, and the amplified spontaneous emission (ASE) noise of the amplified traces is filtered out by a fiber Bragg grating 282. A photodetector 290 is configured to convert light intensities into electrical signals. The filtered backscattered traces are sensed by the photodetector 290, and the photodetector 290 provides representative electrical signals to an analog-to-digital (A/D) converter 292.

The analog-to-digital converter 292 is configured to sample the electrical signals from the photodetector 290 and provides representative digital data to a processing system 294 (such as a computer, an oscilloscope) for further processing, presentation (for example, to a user), or both. In the illustrated example, the analog-to-digital converter 292 is configured to sample the output of the photodetector 290 at a 125 MHz rate. The processing system 294 is configured to determine a normalized differential trace that is based on the backscattered light. The normalized differential trace and the process for determining it are described in more detail in later paragraphs.

In the descriptions of FIGS. 3-6, an example experimental investigation of the capabilities of the normalized differential trace technique using a direct detection scheme, such as that provided by the example systems 100 or 200 of FIG. 1 or 2, will be discussed. In general, these signal-processing techniques are used to detect vibrations with frequencies up to the Nyquist frequency while also exhibiting acceptable signal to nose ratios (SNR). The performance of these techniques beyond the Nyquist limit will also be described.

Figure 3:
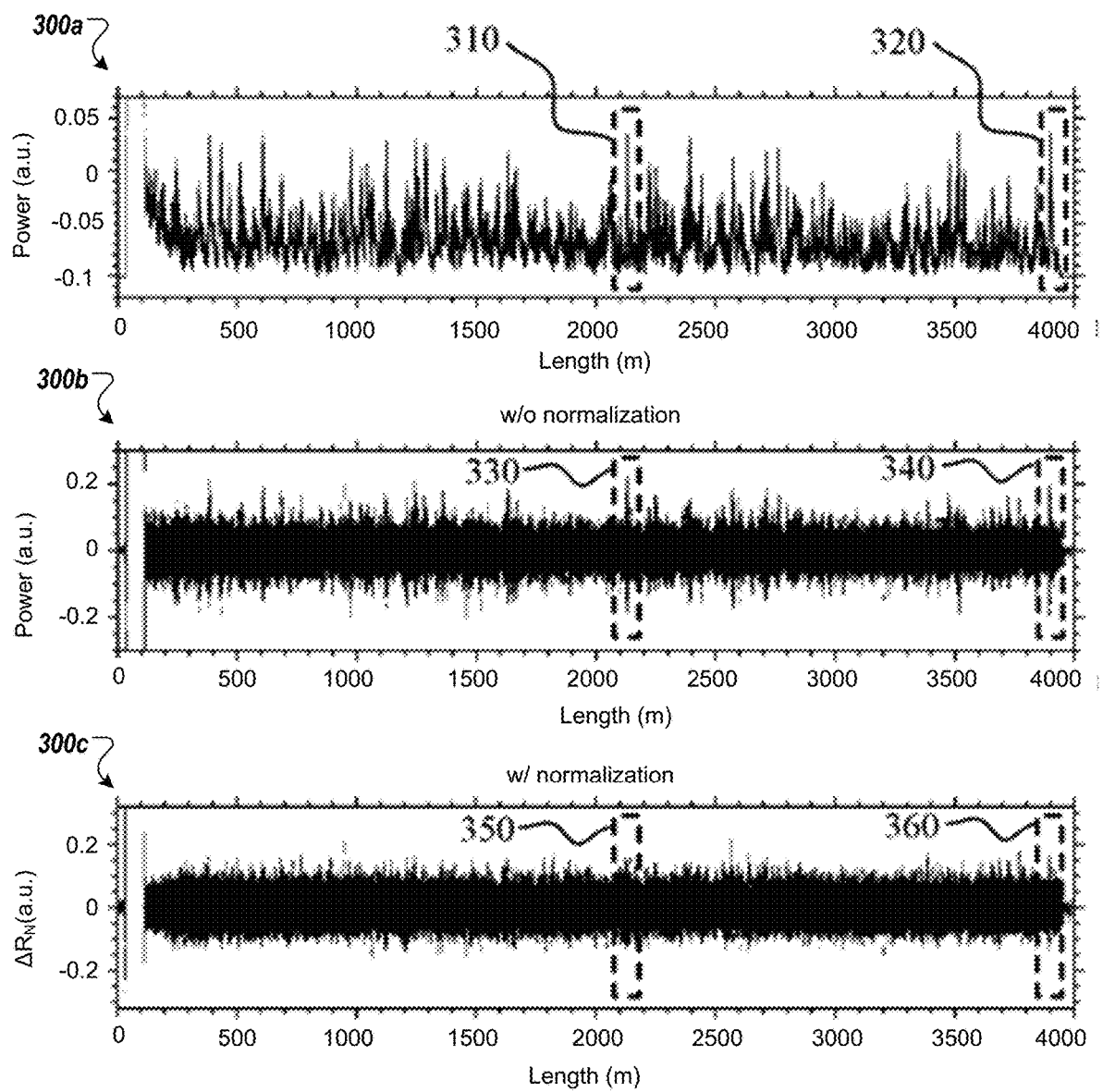
FIG. 3 shows examples of Rayleigh traces and their differences without and with normalization.

FIG. 3 shows examples of Rayleigh traces and their differences without and with normalization. In the illustrated example, the experiment is performed while keeping the PZT (such as the PZT cylinder 248) static. Graph 300a shows a representative example of 100 consecutive recorded Rayleigh traces. The horizontal axis represents length along the fiber in units of meters, and the vertical axis represents power in arbitrary units (a.u.). For each trace, as shown in graph 300a, the reflected signals from the fiber have different intensities caused by constructive and destructive interference. The high intensity-signal at the beginning of the traces is caused by the fiber front facet reflection, not Rayleigh scattering. There are typically two objectives for an Φ-OTDR based DAS: discovering a location along the fiber subjected to an acoustic wave, and calculating the frequency components of this vibration. In some examples, the first objective can be accomplished by using the typical differential method, for example, by subtracting the consecutive Rayleigh traces. In graph 300b, the typical differential signal of the 100 consecutive traces is shown.

The results of graph 300b illustrate a basic example of the background noise of the experimental setup. The horizontal axis represents length along the fiber in units of meters, and the vertical axis represents power in arbitrary units (a.u.). As shown by the graph 300b, the noise values are not uniform along the fiber length, but they can depend on the original intensities within the Rayleigh traces. For example, with regard to the performance of two arbitrary high intensity speckles, marked as 310 and 320 in graph 300a. By monitoring their corresponding noise values, marked as 330 and 340 in graph 300b, these two speckles produce higher noise values than those of lower intensities. This is logical since the percentage of trace fluctuation is almost constant along the whole fiber, therefore the differences between high intensity speckles is generally larger than that of low-intensity ones. In some examples, when a vibration occurs at a position along the fiber that originally produces a low intensity signal within the Rayleigh traces, that vibration's corresponding differential signal can submerge into the noise background, which causes uncertainty in identifying the location of the vibration. This is a major drawback of using the typical differential method and therefore averaging is required by such previous solutions in order to reduce the noise level.

For the systems described in this document, the normalized differential trace is defined as:

$$\Delta R_N = \frac{R_{i+1} - R_i}{R_i}, i \in [1, N-1], \quad \text{Equation 1}$$

where $R_i$ denotes the $i^{th}$ Rayleigh trace and N represents the total number of traces. Graph 300c shows $\Delta R_N$ of the 100 Rayleigh traces presented in graph 300a. In contrast to the results shown as graph 300b, the normalized differential method significantly improves noise equalization along the fiber, which consequently would enable the identification of vibration locations even if their Rayleigh signals were originally weak. The horizontal axis represents length along the fiber in units of meters, and the vertical axis represents $\Delta R_N$ in arbitrary units (a.u.). For example, the two signals marked as 350 and 360 in the graph 300c, which calculated by the two Rayleigh speckles marked as 310 and 320 in the graph 300a, can have roughly the same noise level as the other points.

Figure 4:
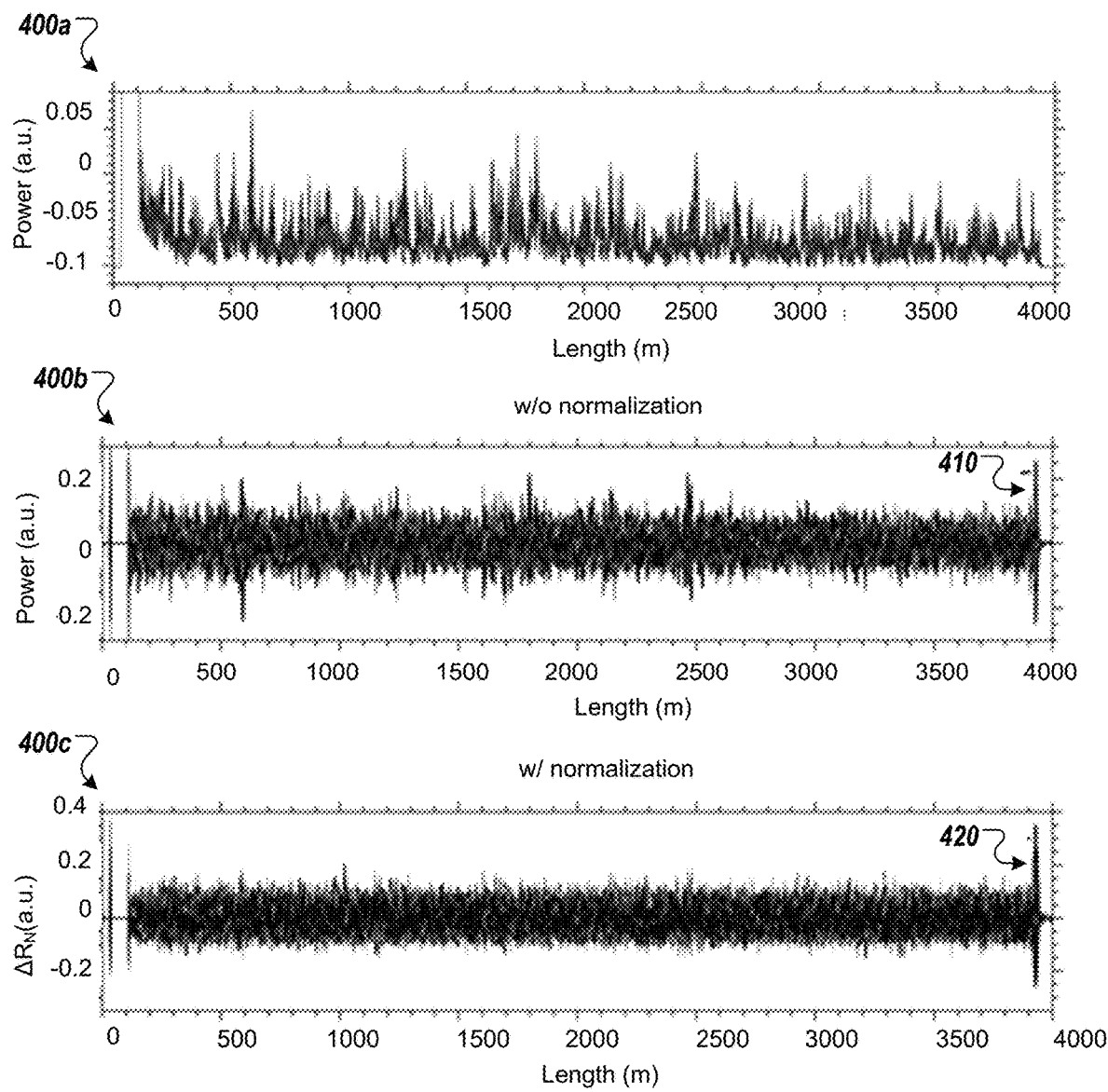
FIG. 4 shows examples of Rayleigh traces when sensing vibrations and their differences without and with normalization.

FIG. 4 shows Rayleigh traces when sensing vibrations (as graph 400a) and their differences without (as graph 400b) and with (as graph 400c) normalization. In some examples, the traces are example outputs of the example system 100 of FIG. 1 or the example system 200 of FIG. 2.

Graphs 400a-400c illustrate an example of the influence of the normalized differential method on the SNR of a DAS system and provide an example comparison between an example result of the normalized differential method and an example result of the typical differential method when detecting vibrations provided by a PZT (such as the PZT cylinder 248 of FIG. 2).

Graph 400a shows an example result of 100 consecutive Rayleigh traces recorded when the PZT, located near the fiber end, vibrates sinusoidally with an example 2 kHz frequency. In the illustrated example, the traces of FIG. 400a are raw Rayleigh traces without any averaging. The horizontal axis represents length along the fiber in units of meters, and the vertical axis represents power in arbitrary units (a.u.).

Graph 400b shows an example of typical differential signals, whereas graph 400c shows an example of normalized differential signals. In graph 400b, the vibration location corresponds to the spike identified by 410, and in the graph 400c the vibration location corresponds to the spike identified by 420. The horizontal axis in graphs 400b and 400c represent length along the fiber in units of meters. In graph 400b the vertical axis represents power in arbitrary units (a.u.). In graph 400c, the vertical axis represents $\Delta R_N$ in arbitrary units (a.u.). In some examples, SNR is defined as the ratio between the peak-to-peak power variation at the vibration location and that of the background noise level. Using this definition, the SNR values of the example results shown as 410 and 420 are 0.61 decibels (dB) and 2.31 dB respectively. As shown by the illustrated example, the normalized differential process significantly improves the SNR of the Φ-OTDR based DAS system. In examples in which the minimum accepted SNR value of the Φ-OTDR based DAS system is ~2 dB, the vibration signal would be buried in noise when using the typical process (as shown in graph 400b for example), while the vibration signal is quite clear when using the normalized differential process (for example, as shown in graph 400c).

Figure 5:
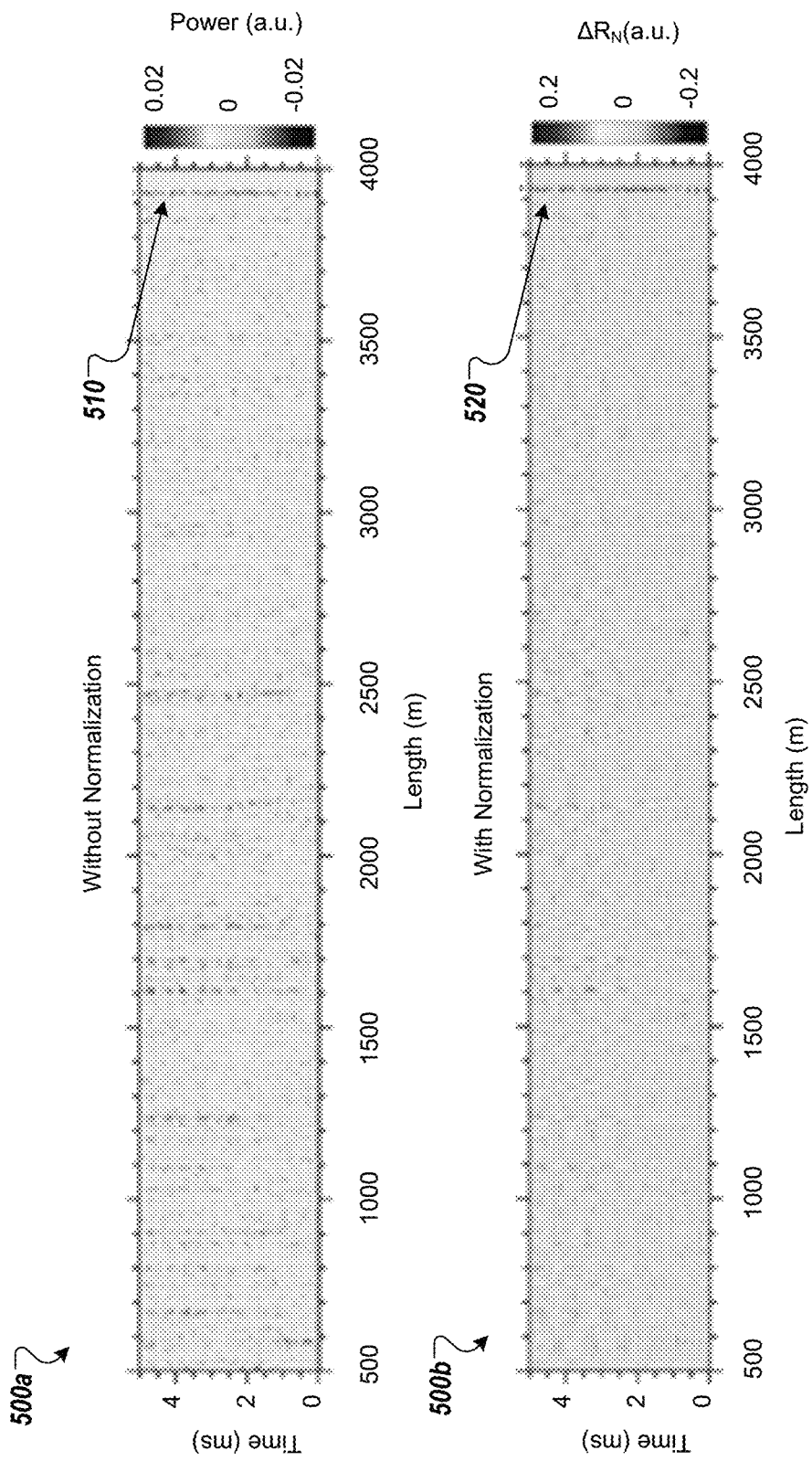
FIG. 5 shows an example of temporal evolution of the difference between Rayleigh traces without and with normalization.

FIG. 5 shows an example of temporal evolution of the difference between Rayleigh traces without (graph 500a) and with normalization (graph 500b). The horizontal axes represent length along the fiber in units of meters. In graph 500a, the vertical axis represents time in units of milliseconds (ms) and power in arbitrary units. In graph 500b, the vertical axis represents time in units of milliseconds (ms) and $\Delta R_N$ in arbitrary units. In the graph 500a, the location of the vibration is represented by the line at 510, and in the graph 500b, the location of the vibration is represented by the line at 520. In contrast to the results shown in graph 500a, the vibration location (line at 520 in graph 500b) is clearer with respect to the background noise. In some implementations, the graphs 500a and 500b are example outputs of the example system 100 of FIG. 1 or the example system 200 of FIG. 2 in which the analog to digital converter 292 is configured to operate at a sampling frequency that is at least twice that of the Nyquist limit of the light pulse generator 201. For example, in order to sense vibrations up to 10 kHz, the light pulse generator 201 is configured to pulse at a rate of at least 20 kHz, and the analog-to-digital converter 292 is configured to sample at a rate of at least 20 kHz (such as 125 MHz in the earlier examples). Without averaging the Rayleigh traces, and based on sampling theory, the theoretical maximum detectable vibration frequency in our experiment would be 10 kHz, which is the Nyquist frequency of such a configuration.

Figure 6:
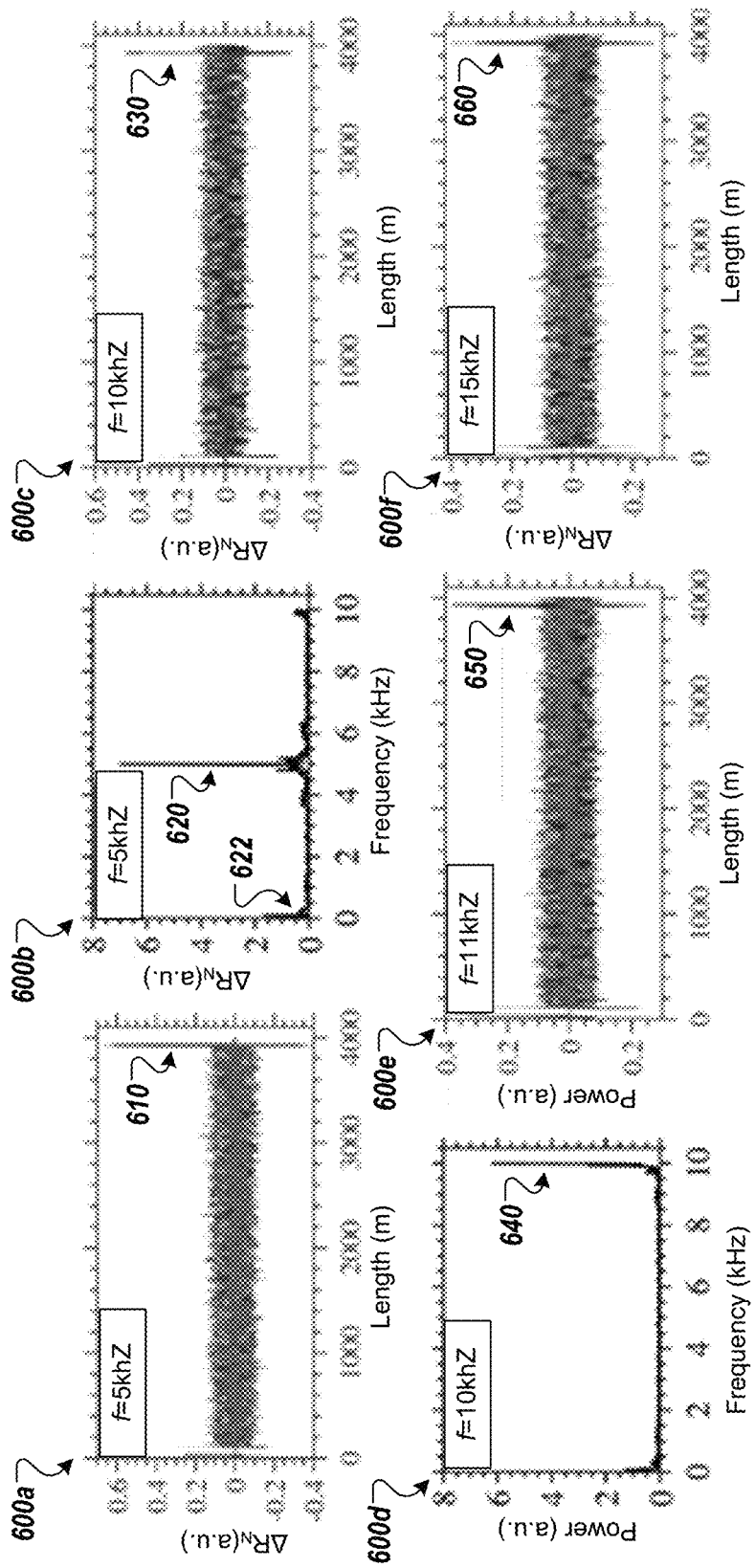
FIG. 6 shows a collection of example traces in which vibration is detected.

FIG. 6 shows a collection of example traces in which vibration is detected, for example, by the example systems 100 or 200 of FIGS. 1 and 2. FIG. 6 illustrates an investigation of the ability of the normalized differential signal processing process to detect high vibration frequencies up to the Nyquist limit.

In the graph 600a the position of the PZT source (for example, the PZT cylinder 248), is represented by a spike at 610, when the PZT is vibrating with 5 kHz frequency. The horizontal axis represents length along the fiber in units of meters, and the vertical axis represents $\Delta R_N$ in arbitrary units (a.u.). Once the vibration location is identified, the vibration frequency is calculated by applying a Fourier transform on the Rayleigh raw traces at 610.

Graph 600b shows an example of the power spectrum 620 of the 5 kHz vibration event (such as the trace at 610) processed using the normalized differential process. The horizontal axis represents frequency in kilohertz (kHz), and the vertical axis represents $\Delta R_N$ in arbitrary units (a.u.). In the illustrated example, a low-frequency noise (about <100 Hz in the illustrated example) is also sensed in the power spectrum at 622, which can be attributed to ambient (background) mechanical vibrations in the experimental laboratory.

Graph 600c represents example traces when the PZT is driven with a 10 kHz vibration frequency. The horizontal axis represents length along the fiber in units of meters, and the vertical axis represents $\Delta R_N$ in arbitrary units (a.u.). The vibration position can still be identified at 630.

Graph 600d shows an example of the power spectrum 640 of the 10 kHz vibration event (such as the trace at 630) processed using the normalized differential process. The horizontal axis represents frequency in kilohertz (kHz), and the vertical axis represents power in arbitrary units (a.u.). As shown by graph 600d, the frequency 640 can still be identified efficiently.

The aforementioned examples demonstrate the capabilities of the example systems 100 and 200 up to the Nyquist limit. In some implementations, it may be acceptable or desirable to identify vibration events without determining their corresponding frequencies. For example, graph 600e illustrates an example output of the system 100 or 200 configured to use the normalized differential process only to locate the vibration position where the PZT is driven by 11 kHz. The horizontal axis represents length along the fiber in units of meters, and the vertical axis represents power in arbitrary units (a.u.). A vibration event 650 is successfully detected at the 11 kHz frequency. In another example, graph 600f illustrates an example output of the system 100 or 200 configured to use the normalized differential process only to locate the vibration position where the PZT is driven by 15 kHz. The horizontal axis represents length along the fiber in units of meters, and the vertical axis represents $\Delta R_N$ in arbitrary units (a.u.). A vibration event 660 is successfully detected at the 15 kHz frequency.

Figure 7:
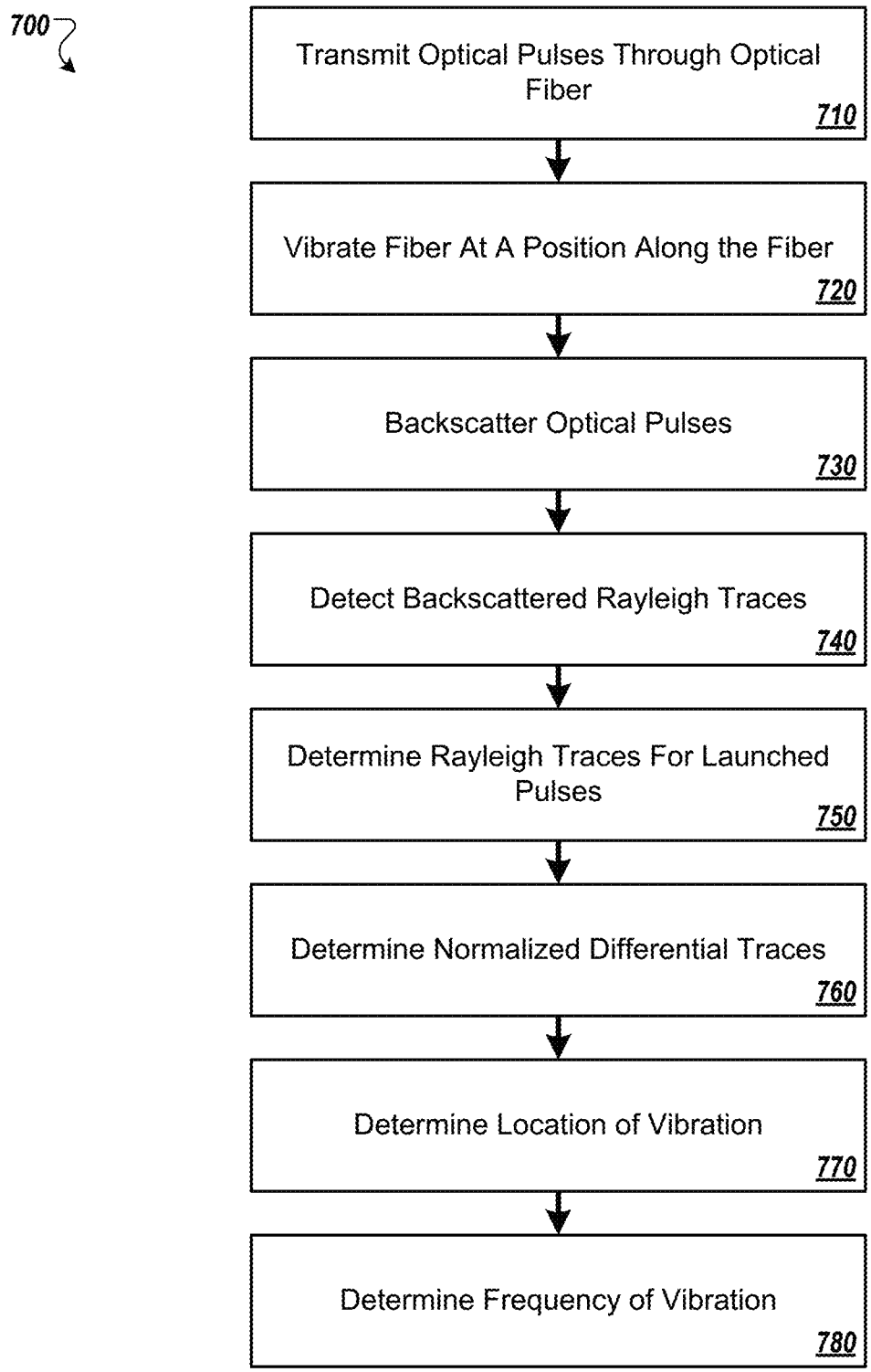
FIG. 7 is flow chart that shows an example of a process for remotely sensing vibration.

FIG. 7 is flow chart that shows an example of a process 700 for remotely sensing vibration. In some implementations, the process 700 is performed by all or part of the example system 100 of FIG. 1, or the example system 200 of FIG. 2. In some implementations, the example graphs 300c, 400c, 500b, 600a, 600c, 600e, and 600f of FIGS. 3-6 are example outputs of the process 700.

At 710, a collection of optical pulses are transmitted through an optical fiber at a predetermined frequency. In some implementations, the optical fiber is a single-mode fiber under test. For example, the example light pulse generator 201 of FIG. 2 can launch light pulses into the FUT 240. In many of the earlier examples, the light is pulsed at a rate of 20 kHz, which is just an example. In some implementations, any appropriate pulse rate can be used.

In some implementations, transmitting the collection of optical pulses through an optical fiber at a predetermined frequency can include generating by a light source continuous-wave light, converting by a first optical modulator the continuous-wave light into the collection of optical pulses having the predetermined frequency, amplifying by an optical amplifier the collection of optical pulses, directing the optical pulses to a first port of an optical circulator, and directing by the optical circulator the optical pulses to a second port of the optical circulator in optical communication with the optical fiber. In some implementations, the continuous-wave light can be tuned by a first polarization controller, the collection of optical pulses can be tuned by a second polarization controller, and an extinction ratio of the optical pulses can be enhanced by a second optical modulator configured to operate in synchronicity with the first optical modulator. For example, light pulse generator 201 can include the light source 210 (such as a laser), the electro-optic modulator 220, the polarization controller 214, the pulse generator 230, the electro-optic modulator 250, the polarization controller 222, and the erbium-doped-fiber-amplifier 260. The amplified modulated light can be provided to an optical port 272 of an optical circulator 270, and the optical circulator 270 can direct the amplified modulated light to the optical port 274 that is optically coupled to the fiber under test 240.

At 720, the optical fiber is vibrated at a vibration frequency at a position along the fiber. For example, the example vibration source 150 emits the vibrations 152 at a particular frequency, and the vibrations 152 intersect the FUT 130 and vibrate the FUT 130 at, near, or around the location 160. In other example, the PZT cylinder 248 vibrates the section 246.

At 730, the optical pulses are partly backscattered because of Rayleigh scattering within the fiber. At a vibration location, the refractive index of the fiber changes which results in modifying the intensity of the backscattered signal only at the vibration position. For example, the vibrations of the FUT 240 by the PZT cylinder 248 modify the time domain Rayleigh signal at the position of the PZT cylinder 248, which yields to a change in the normalized differential signal.

At 740, a collection of backscattered Rayleigh traces is detected. For example, the backscattered light is detected by the receiver 280.

In some implementations, the process 700 can include receiving at the second port of the optical circulator the backscattered Rayleigh traces, directing the backscattered Rayleigh traces to a third port of the optical circulator, amplifying by a second optical amplifier the backscattered Rayleigh traces, filtering by a Bragg grating the amplified backscattered Rayleigh traces, and converting by a photodetector in optical communication with the third port the filtered backscattered Rayleigh traces into a collection of analog electrical signals. For example, the example receiver 280 can include the erbium-doped fiber amplifier 281, the filter 282, the photodetector 290, and the analog-to-digital converter 292. The backscattered light can travel through the fiber under test 240 back to the optical port 274, and the optical circulator 270 can direct the backscattered light to the optical port 276 that is in optical communication with the optical fiber 278. The optical fiber 278 directs the backscattered traces to the receiver 280, where the erbium-doped fiber amplifier 281 amplifies the backscattered light, and the amplified spontaneous emission (ASE) noise of the amplified traces is filtered out by the filter 282. The photodetector 290 converts the intensities of the backscattered traces into analog electrical traces that are measured by the analog-to-digital converter 292.

The analog-to-digital converter 292 is configured to sample the electrical signals from the photodetector 290 and provide representative digital data to a processing system 294 (such as a computer or an oscilloscope) for further processing, presentation (to a user, for example), or both.

At 750, a collection of Rayleigh traces is determined based the launched optical pulses. For example, the receiver 280 or the processing system 294 (or both) determine Rayleigh traces such as those shown in the example graphs 300*a* and 400*a* of FIGS. 3 and 4.

At 760, normalized differential traces are determined based on the collection of Rayleigh traces. For example, the receiver 280 or the processing system 294, or both, determine normalized differential traces such as those shown in the example graphs 300*c*, 400*c*, 500*b*, 600*a*, 600*c*, 600*e*, and 600*f* of FIGS. 3-6.

In some implementations, determining the normalized differential trace based on the collection of Rayleigh traces can include determining the normalized differential trace ($\Delta R_N$) based on a predetermined number (N) of Rayleigh traces (R) as Equation 1 that was shown in a previous paragraph.

At 770, the location of the vibration in the optical fiber is determined, based on the normalized differential trace. For example, the receiver 280 or the processing system 294, or both, determine the example locations 330, 420, 520, 610, 630, 650, and 660 of FIGS. 3-6.

At 780, the vibration frequency is determined based on the raw Rayleigh traces without averaging. For example, the receiver 280 or the processing system 294, or both, determine the example frequencies 620 and 640 of FIG. 6.

In some implementations, the collection of optical pulses can be transmitted at a predetermined frequency, and the vibration frequency can be determined up to substantially the Nyquist frequency of the predetermined frequency. For example, the sensor 280 can determine vibration frequencies up to 10 kHz when the emitted light pulse rate is 20 kHz.

Figure 8:
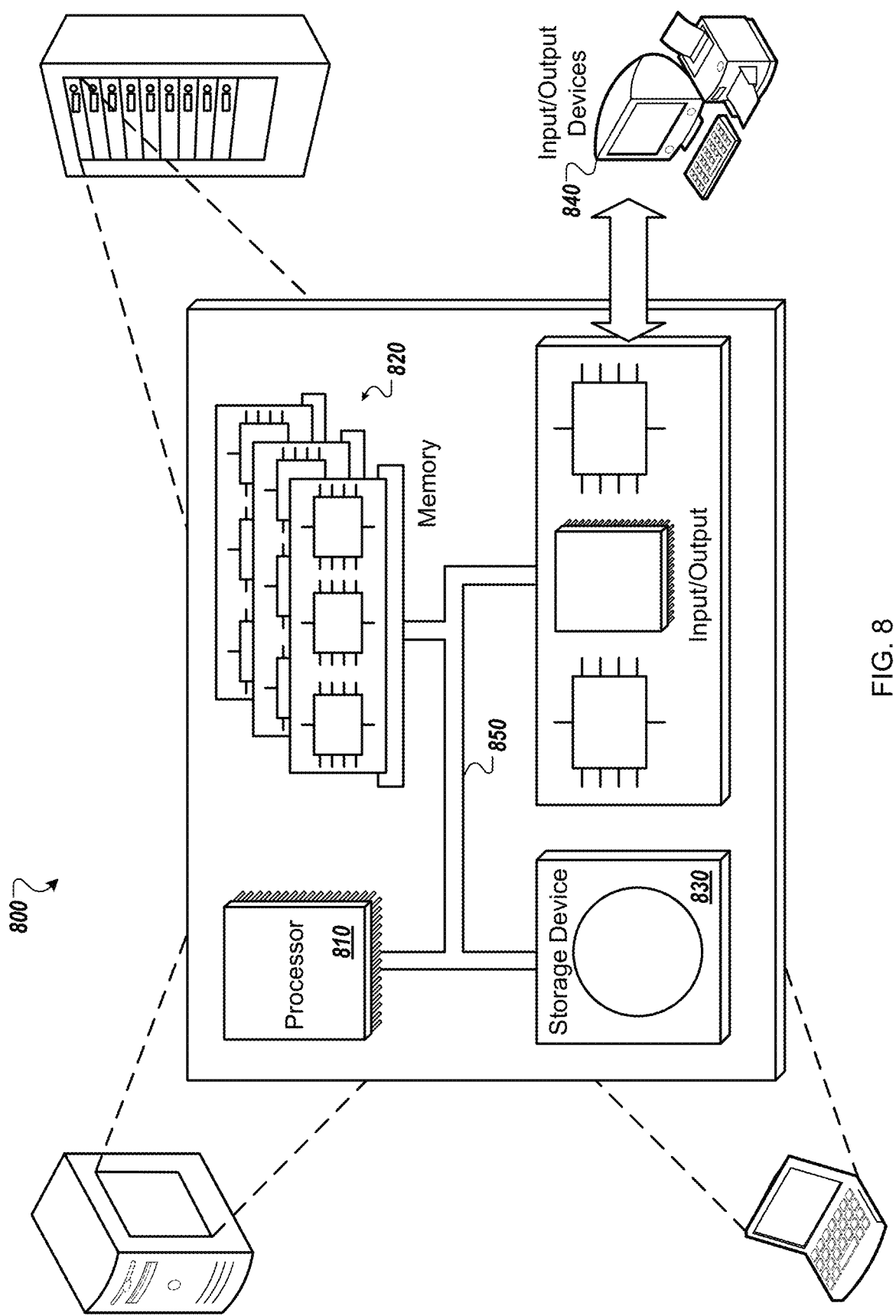
FIG. 8 is a schematic diagram of an example of a generic computer system.

FIG. 8 is a schematic diagram of an example of a generic computer system 800. The system 800 can be used for the operations described in association with the method 300 according to one implementation. For example, the system 800 may be included in either or all of the example system 100 of FIG. 1 or the example system 200 of FIG. 2.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/output device 840 includes a keyboard, a pointing device, or both. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, such as a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as erasable programmable read-only memory (EPROM), electronically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a local area network (LAN), a wide area network (WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail in the earlier paragraphs, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for remotely sensing vibration, comprising:
transmitting, by a light pulse generator apparatus, a plurality of optical pulses through an optical fiber at a predetermined frequency, the transmitting comprising:
generating, by a light source of the light pulse generator apparatus, continuous-wave light;
converting, by a first optical modulator of the light pulse generator apparatus, the continuous-wave light into the plurality of optical pulses having the predetermined frequency;
amplifying, by an optical amplifier of the light pulse generator apparatus, the plurality of optical pulses;
directing the optical pulses to a first port of an optical circulator of the light pulse generator apparatus;
directing, by the optical circulator, the optical pulses to a second port of the optical circulator in optical communication with the optical fiber;
tuning, by a first polarization controller of the light pulse generator apparatus, the continuous-wave light;
tuning, by a second polarization controller of the light pulse generator apparatus, the plurality of optical pulses; and
enhancing, by a second optical modulator of the light pulse generator apparatus, configured to operate substantially in synchronicity with the first optical modulator, an extinction ratio of the optical pulses;
detecting, by an optical receiver apparatus, a plurality of backscattered Rayleigh traces from the optical fiber based on a vibration of the optical fiber at a vibration frequency at a location along the optical fiber;
determining, by the optical receiver apparatus, a normalized differential trace based on the plurality of backscattered Rayleigh traces;
determining, by the optical receiver apparatus, based on the normalized differential trace, the location in the optical fiber of the vibration; and
determining, by the optical receiver apparatus, based on the plurality of backscattered Rayleigh traces, the vibration frequency.

2. The method of claim 1, wherein the plurality of optical pulses is transmitted at a predetermined frequency, and the vibration frequency is determined up to substantially the Nyquist frequency of the predetermined frequency.

3. The method of claim 1, wherein determining the normalized differential trace based on the plurality of Rayleigh traces further comprises determining the normalized differential trace ($\Delta R_N$) based on a predetermined number (N) of Rayleigh traces (R) as $\Delta R_N = (R_{i+1} - R_i)/R_i$, $i \in [1, N-1]$.

4. The method of claim 1, further comprising:
receiving, at the second port of the optical circulator, the backscattered Rayleigh traces;
directing the backscattered Rayleigh traces to a third port of the optical circulator;
amplifying, by a second optical amplifier, the backscattered Rayleigh traces;
filtering, by a Bragg grating, the amplified backscattered Rayleigh traces; and
converting, by a photodetector in optical communication with the third port, the filtered backscattered Rayleigh traces into a plurality of analog electrical signals.

5. The method of claim 1, wherein the optical fiber is a single-mode fiber under test.

6. A vibration sensor system comprising:
a light pulse generator apparatus configured to provide a plurality of optical pulses, the light pulse generator apparatus comprising:
a light source configured to generate continuous-wave light;
a first optical modulator configured to convert the continuous-wave light into the plurality of optical pulses having a predetermined frequency;
an optical amplifier configured to amplify the plurality of optical pulses;
an optical circulator having a first port configured to receive the optical pulses and provide the optical pulses to a second port that is optically coupled to an optical fiber, wherein the second port is also configured to receive a backscattering of Rayleigh traces and provide the backscattered Rayleigh traces to a third port that is in optical communication with the sensor;
a first polarization controller configured to tune the continuous-wave light;
a second polarization controller configured to tune the plurality of optical pulses; and
a second optical modulator configured to operate substantially in synchronicity with the first optical modulator to enhance an extinction ratio of the optical pulses;
an optical fiber having a predetermined length and configured to guide the optical pulses; and
a sensor configured to determine a location and frequency of a vibration of the optical fiber at a location along the optical fiber, based on a normalized differential trace that is determined based on a plurality of backscattered Rayleigh traces.

7. The system of claim 6, wherein the plurality of optical pulses is transmitted at a predetermined frequency, and the frequency of the vibration is determined up to substantially the Nyquist frequency of the predetermined frequency.

8. The system of claim 6, wherein the normalized differential trace ($\Delta R_N$) is determined based on a predetermined number (N) of Rayleigh traces (R) as $\Delta R_N = (R_{i+1} - R_i)/R_i$, $i \in [1, N-1]$.

9. The system of claim 6, wherein the sensor comprises:
an optical amplifier configured to amplify the backscattering of the Rayleigh traces;
a Bragg grating configured to filter the amplified backscattering of the Rayleigh traces; and
a photodetector in optical communication with the third port, configured to convert the filtered backscattered Rayleigh traces into a plurality of analog electrical signals.

10. The system of claim 6, wherein the optical fiber is a single-mode fiber under test.

11. The system of claim 6, further comprising a non-transitory computer storage medium encoded with a computer program, the program comprising instructions that when executed by data processing apparatus cause the data processing apparatus to perform operations comprising:
transmitting the plurality of optical pulses through the optical fiber at a predetermined frequency;
detecting the backscattering of the plurality of Rayleigh traces from the optical fiber based on a vibration of the optical fiber at a vibration frequency at a location along the optical fiber;
determining a normalized differential trace based on the plurality of Rayleigh traces;
determining, based on the normalized differential trace, the location in the optical fiber of the vibration; and
determining, based on the plurality of Rayleigh traces, the vibration frequency.

12. A non-transitory computer storage medium encoded with a computer program, the program comprising instructions that when executed by data processing apparatus cause the data processing apparatus to perform operations comprising:
controlling a light pulse generator apparatus to transmit a plurality of optical pulses through an optical fiber at a predetermined frequency, the transmitting comprising:
generating, by a light source of the light pulse generator apparatus, continuous-wave light;
converting, by a first optical modulator of the light pulse generator apparatus, the continuous-wave light into the plurality of optical pulses having the predetermined frequency;
amplifying, by an optical amplifier of the light pulse generator apparatus, the plurality of optical pulses;
directing the optical pulses to a first port of an optical circulator of the light pulse generator apparatus;
directing, by the optical circulator, the optical pulses to a second port of the optical circulator of the light pulse generator apparatus in optical communication with the optical fiber;
tuning, by a first polarization controller of the light pulse generator apparatus, the continuous-wave light;
tuning, by a second polarization controller of the light pulse generator apparatus, the plurality of optical pulses; and
enhancing, by a second optical modulator of the light pulse generator apparatus, configured to operate substantially in synchronicity with the first optical modulator, an extinction ratio of the optical pulses;
controlling an optical receiver apparatus to determine a vibration frequency at a location along the optical fiber, the controlling comprising:
digitizing, by the optical receiver apparatus, a plurality of backscattered Rayleigh traces from the optical fiber based on a vibration of the optical fiber at the vibration frequency at the location along the optical fiber;
determining, by the optical receiver apparatus, a normalized differential trace based on the plurality of backscattered Rayleigh traces;
determining, by the optical receiver apparatus, based on the normalized differential trace, the location along the optical fiber; and
determining, by the optical receiver apparatus, based on the plurality of backscattered Rayleigh traces, the vibration frequency.

13. The non-transitory computer storage medium of claim 12, wherein the backscattered Rayleigh traces of a plurality of optical pulses are transmitted at a predetermined frequency, and the vibration frequency is determined up to substantially the Nyquist frequency of the predetermined frequency.

14. The non-transitory computer storage medium of claim 12, wherein determining the normalized differential trace based on the plurality of Rayleigh traces further comprises determining the normalized differential trace ($\Delta R_N$) based on a predetermined number (N) of Rayleigh traces (R) as $\Delta R_N = (R_{i+1} - R_i)/R_i$, $i \in [1, N-1]$.

15. The non-transitory computer storage medium of claim 12, the operations further comprising transmitting a plurality of optical pulses through the optical fiber at a predetermined frequency.

* * * * *